(12) United States Patent
Gotsubo et al.

(10) Patent No.: US 9,146,818 B2
(45) Date of Patent: Sep. 29, 2015

(54) MEMORY DEGENERACY METHOD AND INFORMATION PROCESSING DEVICE

(71) Applicant: FUJITSU LIMITED, Kawasaki-shi, Kanagawa (JP)

(72) Inventors: Kenji Gotsubo, Yokohama (JP); Atsushi Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/287,311

(22) Filed: May 27, 2014

(65) Prior Publication Data

US 2014/0281694 A1     Sep. 18, 2014

Related U.S. Application Data

(63) Continuation of application No. PCT/JP2011/077421, filed on Nov. 28, 2011.

(51) Int. Cl.
*G06F 11/20* (2006.01)
*G06F 11/14* (2006.01)
*G06F 12/16* (2006.01)
*G06F 9/46* (2006.01)
(Continued)

(52) U.S. Cl.
CPC .............. *G06F 11/1484* (2013.01); *G06F 9/46* (2013.01); *G06F 11/073* (2013.01); *G06F 11/0775* (2013.01); *G06F 11/142* (2013.01); *G06F 11/30* (2013.01); *G06F 12/16* (2013.01); *G06F 11/0712* (2013.01); *G06F 12/10* (2013.01); *G06F 2009/45583* (2013.01); *G06F 2212/151* (2013.01)

(58) Field of Classification Search
CPC . G06F 11/0712; G06F 11/20; G06F 11/1666; G06F 2009/45575; G06F 2009/45583; G06F 12/109; G06F 12/1009; G06F 11/1484
See application file for complete search history.

(56) References Cited

U.S. PATENT DOCUMENTS 8,407,515 B2 *   3/2013   Heyrman et al. ............ 714/6.12
2006/0143534 A1 *   6/2006   Dall ................................ 714/38
(Continued)

FOREIGN PATENT DOCUMENTS

JP    2007-226413    9/2007
JP    2008-165777    7/2008
(Continued)

OTHER PUBLICATIONS

International Search Report of Int. Appl. No. PCT/JP2011/077421 dated Feb. 28, 2012.

*Primary Examiner* — Joseph Schell
(74) *Attorney, Agent, or Firm* — Fujitsu Patent Center

(57) ABSTRACT

A memory degeneracy method is executed by an information processing device in which a plurality of virtual machines operate. The memory degeneracy method includes storing, in a storage unit, a physical address or address information of a memory module, which corresponds to a virtual physical address relevant to a fault, in response to detecting the fault in a memory area assigned to a first virtual machine; changing an association relationship between virtual physical addresses and physical addresses relevant to the first virtual machine, before an operating system operating on the first virtual machine is rebooted in response to detecting the fault; and removing, from a usage target of the operating system, the virtual physical address corresponding to the physical address or the address information of the memory module stored in the storage unit.

5 Claims, 18 Drawing Sheets

(51) Int. Cl.
*G06F 11/30* (2006.01)
*G06F 11/07* (2006.01)
*G06F 9/455* (2006.01)
*G06F 12/10* (2006.01)

(56) References Cited

U.S. PATENT DOCUMENTS

| | | | |
|---|---|---|---|
| 2007/0074067 A1* | 3/2007 | Rothman et al. | 714/6 |
| 2007/0220350 A1 | 9/2007 | Ogasawara et al. | |
| 2008/0155553 A1 | 6/2008 | Astigarraga et al. | |
| 2009/0248949 A1* | 10/2009 | Khatri et al. | 711/6 |
| 2009/0248950 A1 | 10/2009 | Tamaki et al. | |
| 2011/0271152 A1* | 11/2011 | Hattori et al. | 714/53 |
| 2012/0079165 A1* | 3/2012 | Archer et al. | 711/6 |
| 2012/0110236 A1* | 5/2012 | Ali et al. | 711/6 |
| 2012/0137167 A1* | 5/2012 | Leischner et al. | 714/6.12 |
| 2014/0149795 A1* | 5/2014 | Musha et al. | 714/30 |

FOREIGN PATENT DOCUMENTS

| | | |
|---|---|---|
| JP | 2009-059121 | 3/2009 |
| JP | 2009-230596 | 10/2009 |
| JP | 2009-245216 | 10/2009 |

* cited by examiner

FIG.11

| PAGE NUMBER | USAGE STATE<br>0=NOT IN USE<br>1=IN USE<br>2=NON-USABLE |
|---|---|
| ... | |
| 999 | 1 |
| 1000 | 2 |
| 1001 | 0 |
| ... | |

131b

MEMORY DEGENERACY METHOD AND INFORMATION PROCESSING DEVICE

CROSS-REFERENCE TO RELATED APPLICATION

This application is a U.S. continuation application filed under 35 USC 111(a) claiming benefit under 35 USC 120 and 365(c) of PCT Application PCT/JP2011/077421 filed on Nov. 28, 2011, the entire contents of which are incorporated herein by reference.

FIELD

The embodiments discussed herein are related to a memory degeneracy method and an information processing device.

BACKGROUND

Memory degeneracy (or memory retirement) as used herein means that when a fault is detected (when a memory error has occurred) in part of a main memory (hereinafter, simply referred to as a "memory"), the corresponding part is removed from the usage target (removed from parts of the memory that may be used). By degenerating a memory, it is possible to avoid a situation of repeatedly accessing the position of the fault, and therefore the stability of the operation state of the computer is secured.

Conventionally, in a case where a memory error occurs in the kernel space, the degeneracy of the memory is performed, for example, when the firmware that is the monitoring mechanism that operates the monitoring mechanism in a processor other than the CPU (hereinafter, "system firmware") activates the system (an OS (Operating System) and a software group that operates on the OS).

FIG. 1 is for describing an example of a process overview when a memory error occurs in a kernel space.

In FIG. 1, (1) illustrates a state where a memory error has occurred in the kernel space. In this case, the system firmware stores the memory fault information. The memory fault information is bitmap information in which a bit is assigned to each division unit obtained by dividing the memory area by a predetermined unit. That is to say, the memory fault information is bitmap information in which a flag indicating whether usage is possible is recorded in each division unit.

When the OS panics due to a memory error, and the system starts to reboot, the state shifts to that illustrated in (2). In (2), the system firmware degenerates the division unit where the memory error has occurred, based on the memory fault information.

Next, in (3), when the OS is rebooted, the OS operates without using the degenerated division unit. As a result, it is possible to avoid a panic caused by accessing the fault position again.

In another example, when an error occurs in the user space, the OS may degenerate the memory.

FIG. 2 is for describing an example of a process overview when a memory error occurs in a user space.

In FIG. 2, (1) illustrates a state where a memory error has occurred in the user space. In this case, the OS stores the memory fault information.

Next, as illustrated in (2), the OS degenerates the division unit where the memory error has occurred, based on the memory fault information. In this case the system does not need to be rebooted.

Meanwhile, by virtualization technology, it is possible to activate a plurality of virtual machines in a single computer. In such a virtualization environment, the system firmware is not involved with the activation or the rebooting of the virtual machines. Therefore, when the above mechanism is applied for degenerating the memory, a problem as illustrated in FIG. 3 arises.

FIG. 3 is for describing the problem when a memory error occurs in the virtualization environment. FIG. 3 illustrates an example where n number of virtual machines (VM) are operating:

(1) illustrates a state where a memory error has occurred in the kernel space on VM#2. In this case, as described in FIG. 1, the system firmware stores the memory fault information;

(2) illustrates a state where the OS of VM#2 is panicking due to the memory error. However, the VMs other than VM#2 may continue operating;

(3) illustrates a state where the OS of the VM#2 has started rebooting in response to the panic. In this case, the system firmware is not involved with the rebooting of the VM#2. This is because the activation of the VM is performed by a hypervisor. Therefore, it is not possible to degenerate the memory based on the memory fault information stored by the system firmware. As a result, the OS of the VM#2 panics again, and the state of (2) and the state of (3) are repeated.

Note that in FIG. 3, the memory is degenerated based on the memory fault information when the system (that is to say, all of the virtual machines and the hypervisor) is rebooted.

For example, Patent Document 1 discloses a method of degenerating a memory in a virtualization environment.

Patent Document 1: Japanese Laid-Open Patent Publication No. 2009-245216
Patent Document 2: Japanese Laid-Open Patent Publication No. 2009-230596
Patent Document 3: Japanese Laid-Open Patent Publication No. 2009-59121

However, as the technology described in Patent Document 1, when the memory is degenerated in the unit in which a memory is assigned to the virtual machine, the unit (size) of degenerating the memory depends on the unit in which a memory is assigned to the virtual machine. The unit of degenerating the memory means the size of the memory area degenerated due to a fault in the memory.

FIG. 4 illustrates a state where the unit of degenerating the memory depends on the unit in which a memory is assigned to the virtual machine:

(1) illustrates a state where a memory error has occurred in the kernel space on the VM#2;

(2) illustrates a state where the hypervisor is degenerating the memory. The unit of degenerating the memory is the unit in which a memory is assigned to the virtual machine, and therefore in the example of FIG. 4, the area assigned to the VM#2 is degenerated.

Therefore, when the unit of the memory assigned to the virtual machine is large, the unit of degenerating the memory becomes large, and therefore some normal areas of the memory are wasted.

When the unit in which a memory is assigned to the virtual machine is reduced in an attempt to avoid such circumstances, the larger the installation amount of the memory, the more the number of division units in the above-described state, which enlarges the amount of memory fault information to be managed by the hypervisor.

Furthermore, when the unit in which a memory is assigned to the virtual machine is made to have a variable length, a problem arises in that the control content implemented by the hypervisor becomes complex.

As described above, by the conventional technology, it is difficult to handle a large-scale virtualization environment.

SUMMARY

According to an aspect of the embodiments, there is a memory degeneracy method executed by an information processing device in which a plurality of virtual machines operate, the memory degeneracy method including storing, in a storage unit, a physical address or address information of a memory module, which corresponds to a virtual physical address relevant to a fault, in response to detecting the fault in a memory area assigned to a first virtual machine; changing an association relationship between virtual physical addresses and physical addresses relevant to the first virtual machine, before an operating system operating on the first virtual machine is rebooted in response to detecting the fault; and removing, from a usage target of the operating system, the virtual physical address corresponding to the physical address or the address information of the memory module stored in the storage unit.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 11 illustrates a configuration example of a memory management table;

DESCRIPTION OF EMBODIMENTS

Figure 1:
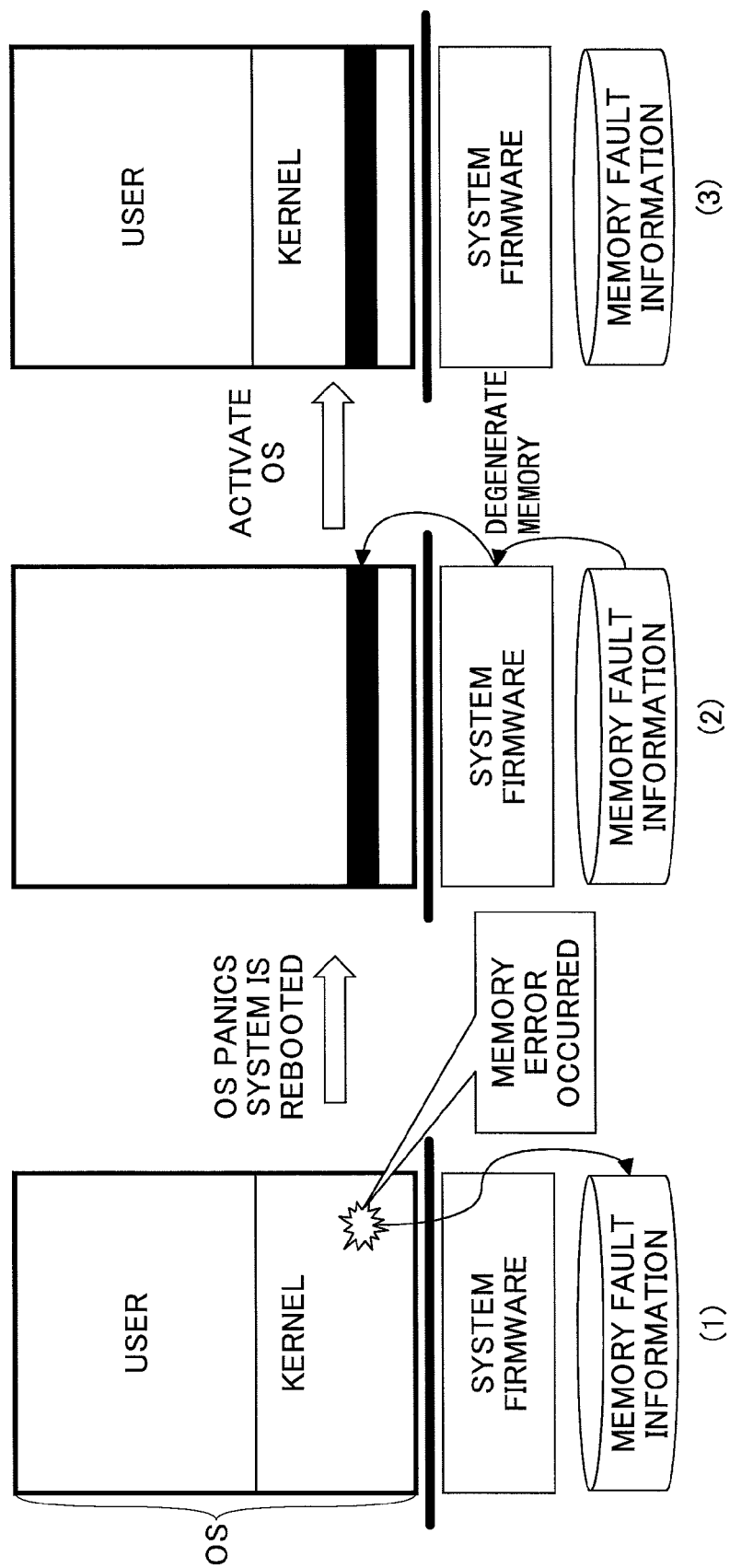
FIG. 1 is for describing an example of a process overview when a memory error occurs in a kernel space.
Figure 2:
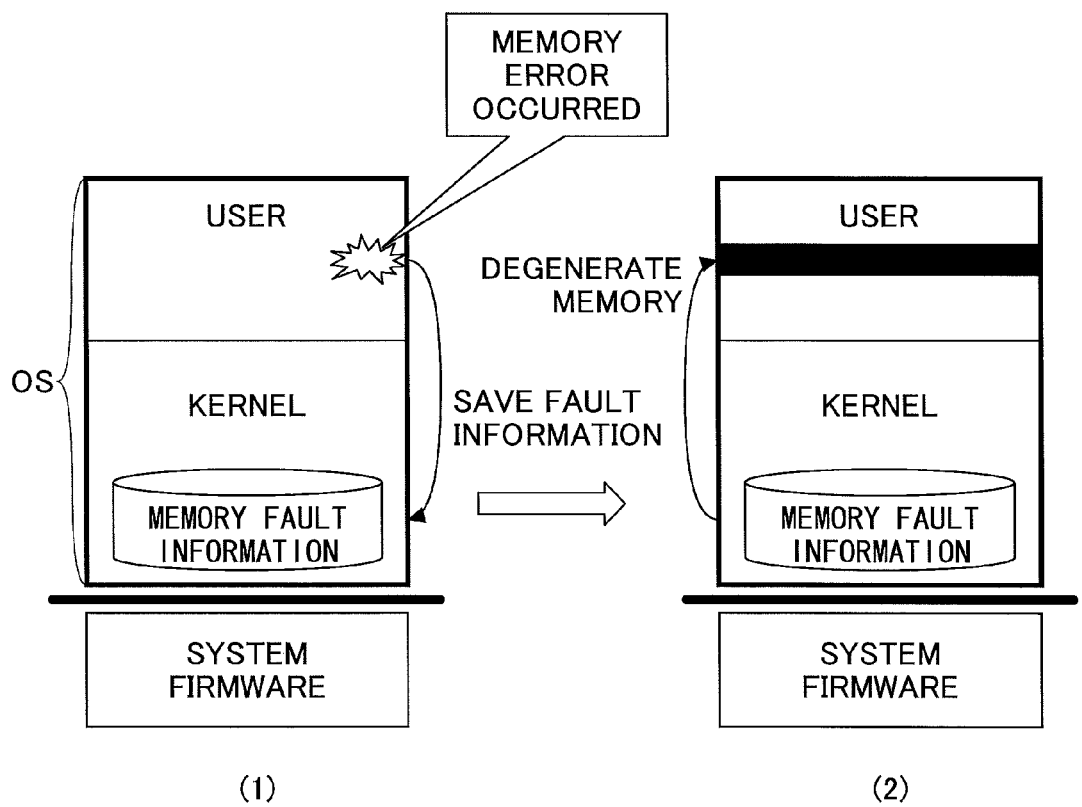
FIG. 2 is for describing an example of a process overview when a memory error occurs in a user space.
Figure 3:
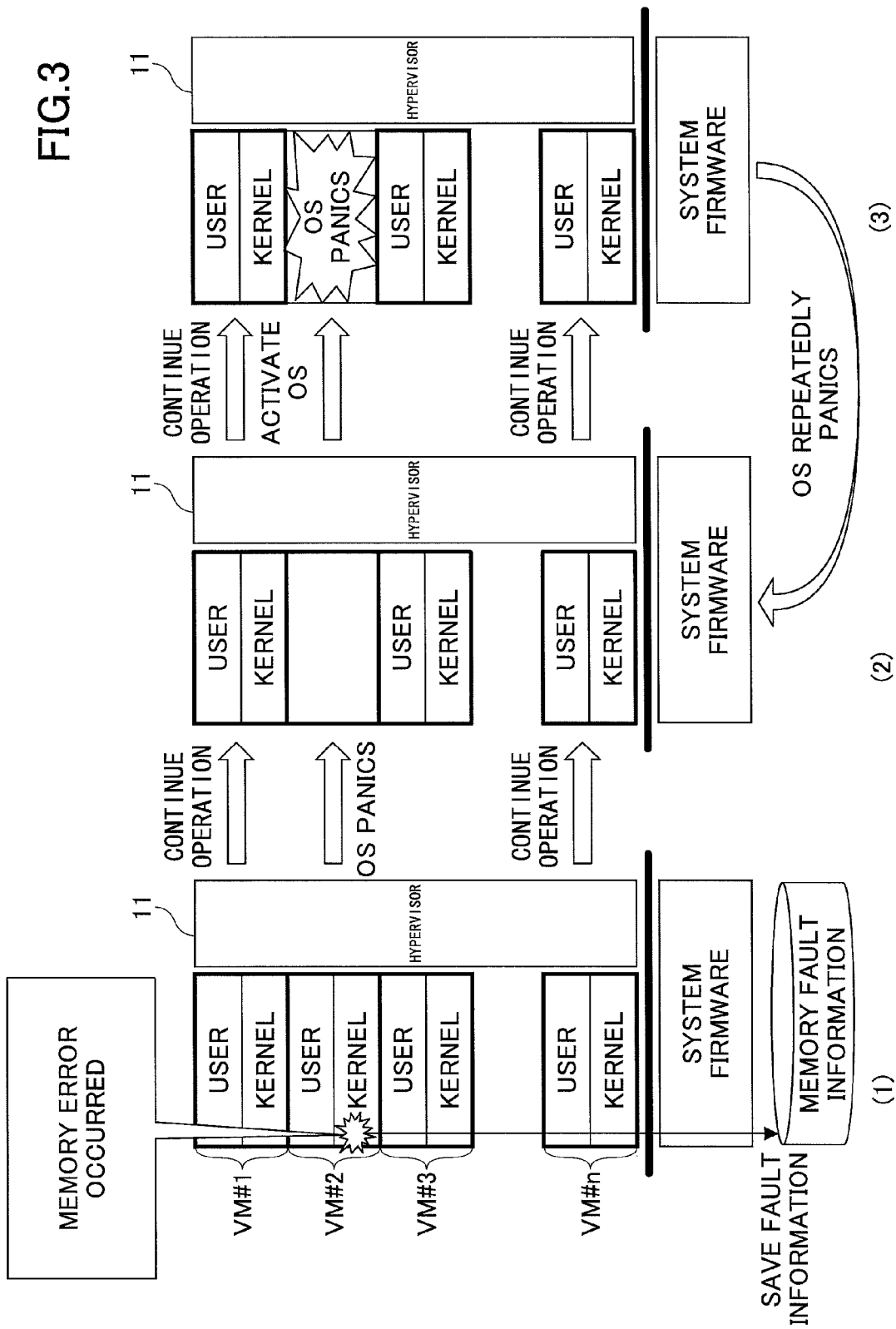
FIG. 3 is for describing the problem when a memory error occurs in a virtualization environment.
Figure 4:
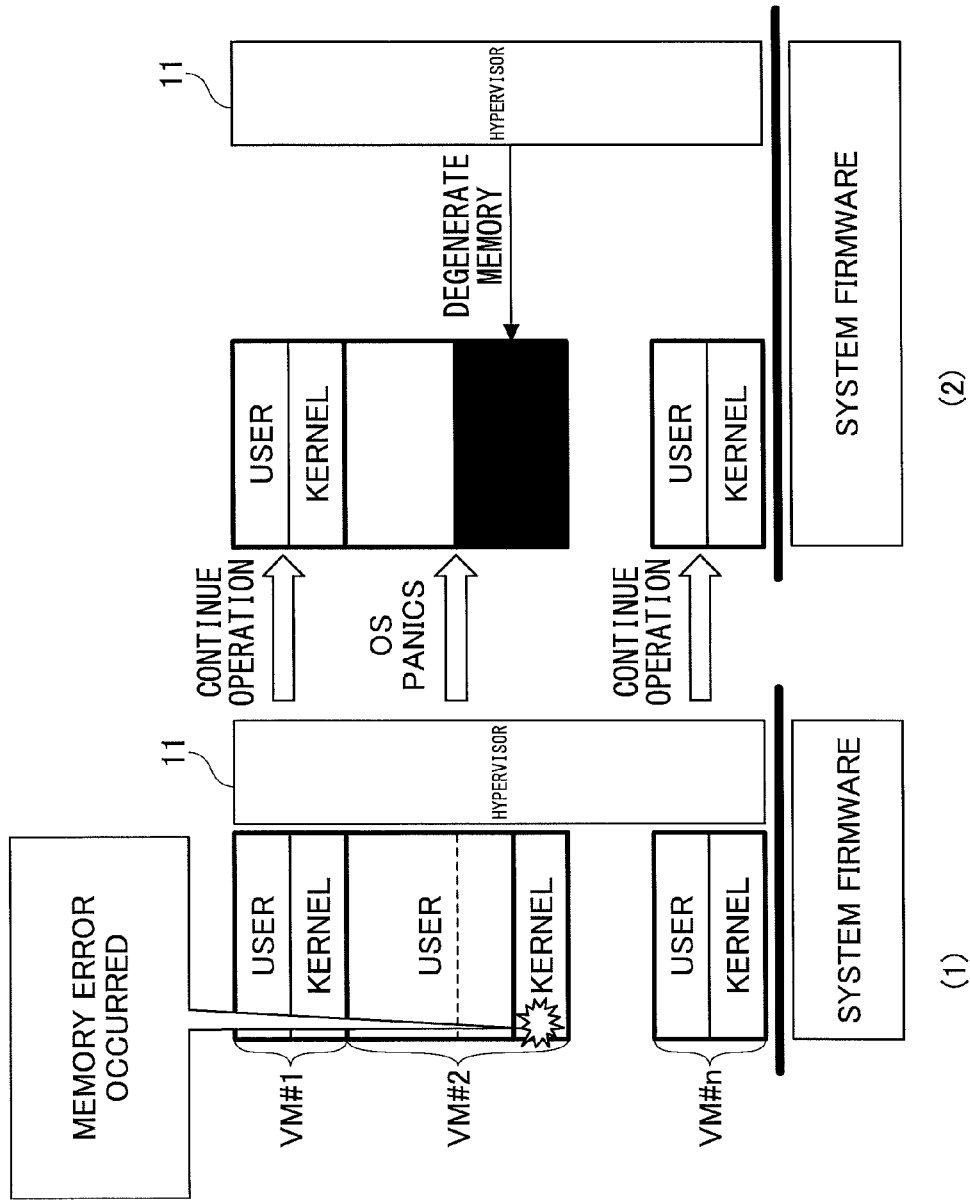
FIG. 4 illustrates a state where the unit of degenerating a memory depends on the unit in which a memory is assigned to a virtual machine.
Figure 5:
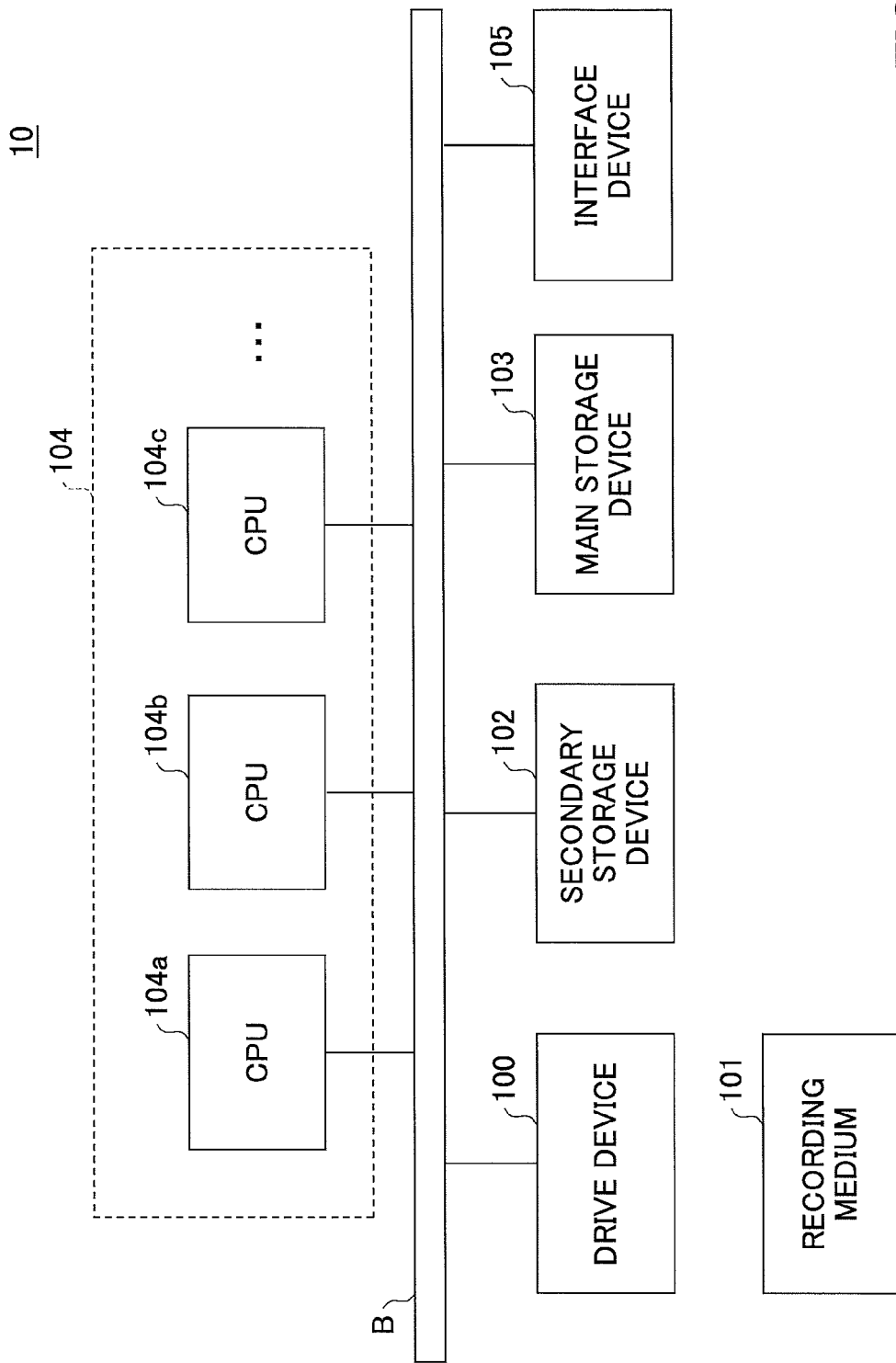
FIG. 5 illustrates a hardware configuration of an information processing device according to an embodiment of the present invention.

Preferred embodiments of the present invention will be explained with reference to accompanying drawings. FIG. 5 illustrates a hardware configuration of an information processing device according to an embodiment of the present invention. In FIG. 5, an information processing device 10 includes a plurality of CPUs 104, such as a CPU 104a, a CPU 104b, a CPU 104c, etc. As described below, each CPU 104 is assigned to one of the virtual machines. Note that the information processing device 10 does not have to include a plurality of CPUs 104. For example, the plurality of CPUs 104 may be replaced by a single multicore processor. In this case, each processor core is to be assigned to one of the virtual machines.

The information processing device 10 further includes a drive device 100, a secondary storage device 102, a main storage device 103, and an interface device 105. The CPU 104 and these hardware components are connected by a bus B.

Programs for realizing processes in the information processing device 10 are provided by a recording medium 101. When the recording medium 101 recording a program is set in the drive device 100, the program is installed in the secondary storage device 102 from the recording medium 101 through the drive device 100. However, the program need not be installed from the recording medium 101; the program may be downloaded from another computer via a network. The secondary storage device 102 stores the installed program as well as files and data needed for the program.

The main storage device 103 reads a program from the secondary storage device 102 and stores the program, when an instruction to activate the program is given. Note that in the following, the main storage device 103 may also be referred to as a "memory". The CPU 104 executes functions relevant to the information processing device 10 according to programs stored in the main storage device 103. The interface device 105 is used as an interface for connecting to a network.

Note that examples of the recording medium 101 are portable recording media such as CD-ROM, DVD disk, or a USB memory. Furthermore, examples of the secondary storage device 102 are HDD (Hard Disk Drive) and a flash memory. Both the recording medium 101 and the secondary storage device 102 correspond to a computer-readable recording medium.

Figure 6:
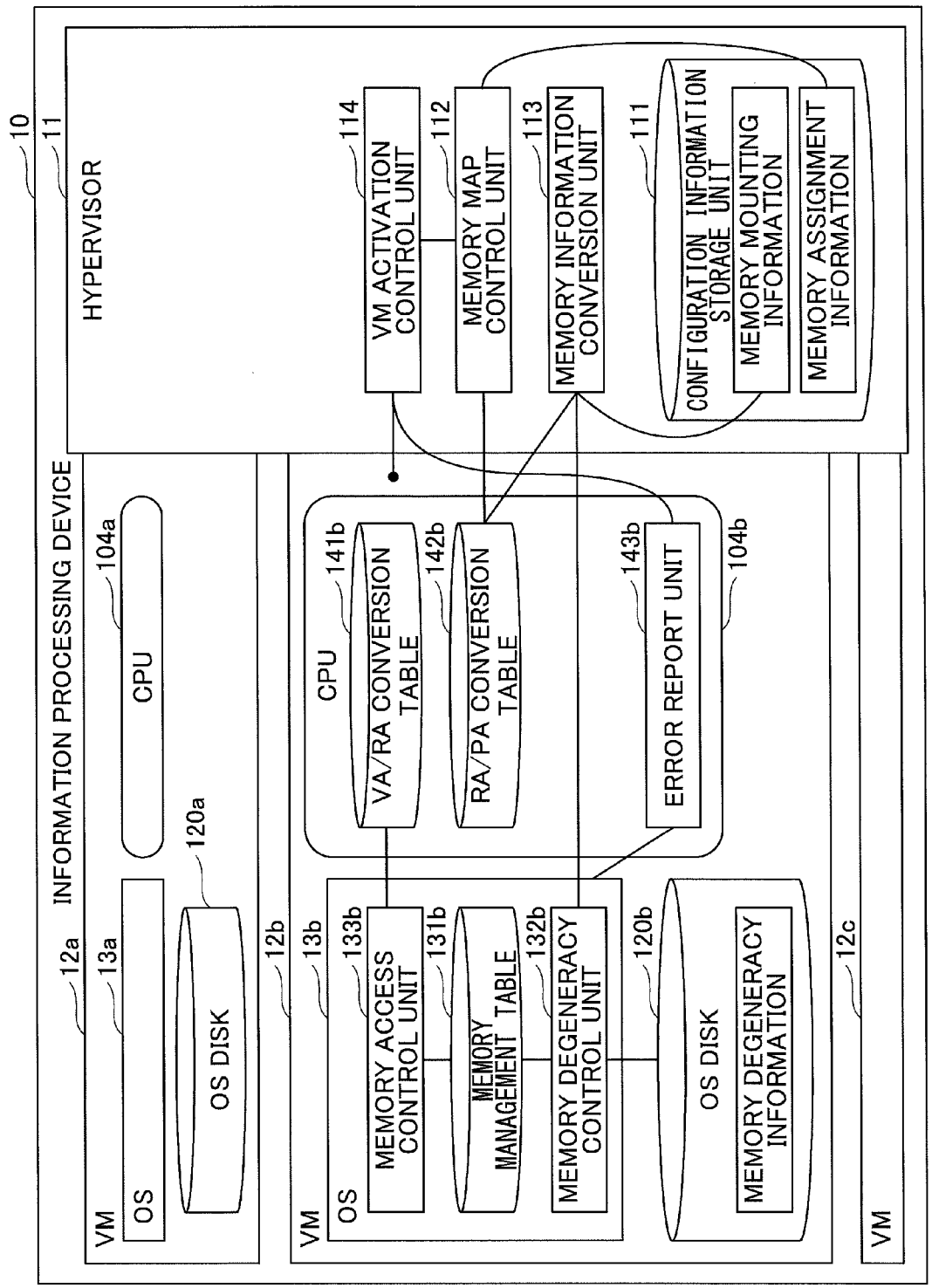
FIG. 6 illustrates an example of a functional configuration of an information processing device according to an embodiment of the present invention.

FIG. 6 illustrates an example of a functional configuration of the information processing device 10 according to an embodiment of the present invention. In FIG. 6, the information processing device 10 includes a hypervisor 11 and a plurality of VMs (virtual machines) 12a through 12c. The hypervisor 11 and the VMs 12 are realized by processes which programs (virtualization programs) installed in the information processing device 10 cause the CPU 104 to execute.

The hypervisor 11 virtualizes the information processing device 10, and makes it possible to execute a plurality of OSs (Operating Systems) 13 in parallel. The hypervisor 11 creates a virtual computer (VM 12) realized by software, and operates the OS 13 in the VM 12. Note that the hypervisor 11 is also referred to as a virtual machine monitor (VMM).

As illustrated in FIG. 6, in each VM 12, a CPU 104 and an OS disk 120 are assigned. Furthermore, in each VM 12, the OS 13 is operated.

Each OS disk 120 is a storage area in part of the secondary storage device 102. In each VM 12, storage areas that do not overlap with each other in the secondary storage device 102, are assigned as the OS disk 120a, 120b, or 120c. However, there may be a plurality of secondary storage devices 102, and the OS disk 120 and the secondary storage device 102 may be associated with each other in a one-on-one manner.

The CPU 104 assigned to each VM 12 includes a VA/RA conversion table 141, an RA/PA conversion table 142, and an error report unit 143. Each VM 12 may only use the CPU 104 assigned to the VM 12 itself, and is unable to use the CPU 104 assigned to another VM 12. Meanwhile, the hypervisor 11 may use all of the CPUs 104.

The VA/RA conversion table 141 stores information (conversion information) for converting a virtual address (hereinafter, "VA") into a virtual physical address (real address, hereinafter, "RA"). For example, the VA/RA conversion table 141 stores the association information of VA and RA as conversion information. Each CPU 104 is unable to access a VA that is not stored in the VA/RA conversion table 141. Furthermore, the VA/RA conversion table 141 may be accessed from the OS 13. Note that the RA is an address that corresponds to the physical address for the OS 13 (or viewed from the OS 13). However, the RA is not an actual physical address; the RA is a physical address that is virtually created by the hypervisor 11.

The RA/PA conversion table 142 stores information (conversion information) for converting RA into a physical address (hereinafter, "PA"). For example, the RA/PA conversion table 142 stores the association information of RA and PA as conversion information. Each CPU 104 is unable to access a RA that is not stored in the RA/PA conversion table 142. The hypervisor 11 may access the RA/PA conversion table 142 of each CPU 104, but the OS 13 is unable to access the RA/PA conversion table 142.

Note that the VA/RA conversion table 141 and the RA/PA conversion table 142 may be realized by using, for example, a register in the CPU 104.

When a fault of the memory is detected according to memory access by the CPU 104, the error report unit 143 reports the accessed address (RA) to the OS 13 and a VM activation control unit 114.

The OS disk 120 of each VM 12 is used as a storage unit for memory degeneracy (or memory retirement) information, when the memory is degenerated (or retired). Memory degeneracy information is information indicating the position of the fault in the memory. In the present embodiment, the memory module constituting the main storage device 103 is assumed to be DIMM (Dual Inline Memory Module). The identification information of DIMM including the fault position (DIMM number), and an offset value of the address corresponding to the fault position in DIMM (DIMM address) are stored as memory fault information. Note that each OS 13 may only access the OS disk 120 assigned to the virtual machine in which the corresponding OS 13 is operating, and is incapable of accessing the OS disk 120 assigned to other virtual machines.

Each OS 13 includes a memory management table 131, a memory degeneracy control unit 132, and a memory access control unit 133.

The memory management table 131 stores information indicating the usage state, in units of pages. A page is the division unit of the memory in a paging method of the virtual storage. That is to say, the memory management table 131 stores the usage state in minimum units of the memory which may be subjected to degeneracy control in the OS 13. Note that the memory management table 131 may be realized with the use of a memory area assigned to the VM 12, among the memory areas realized by the main storage device 103.

The memory degeneracy control unit 132 stores the memory degeneracy information (DIMM number/DIMM address) in the OS disk 120. Furthermore, the memory degeneracy control unit 132 refers to the memory degeneracy information in the OS disk 120, and records a RA that is no longer usable in the memory management table 131.

When acquiring a new virtual memory area, the memory access control unit 133 records, in the VA/RA conversion table 141, association information associating the VA of the acquired virtual memory area and the RA of the virtual physical memory area to be assigned to the VA. When determining the virtual physical memory area to be assigned to the VA, reference is made to the memory management table 131, and a usable virtual physical memory area is selected as the area to be assigned. Therefore, the RA of a virtual physical memory area that is unusable is not recorded in the VA/RA conversion table 141. Generally, there is a limit to the size of the VA/RA conversion table 141 on the CPU 104 in terms of hardware, and therefore the VA/RA conversion table 141 is often managed separately also by the OS 13. In this case, the VA/RA conversion table 141 on the CPU 104 becomes a part of the VA/RA conversion table 141 managed by the OS 13. The CPU 104 automatically reads the mapping information that is needed from the VA/RA conversion table 141 of the OS 13.

The hypervisor 11 includes a configuration information storage unit 111, a memory map control unit 112, a memory information conversion unit 113, and a VM activation control unit 114.

Note that in the present embodiment, the alphabetical letter (a through c) at the end of the reference numeral of the VM 12 is assigned at the end of the reference numeral of the configuration element in each VM 12. For example, "b" is assigned at the end of the reference numeral of a configuration element of the VM 12b.

The configuration information storage unit 111 stores memory assignment information, which is association information associating RA with PA, and memory mounting information, which is association information associating the PA and the DIMM number/DIMM address. The memory assignment information is stored for each VM 12. The configuration information storage unit 111 may be realized with the use of, for example, the main storage device 103.

The memory map control unit 112 refers to the memory assignment information, and registers the conversion information, which expresses the conversion between the RA used by the VM 12 and the PA to be assigned to the VM 12, in the RA/PA conversion table 142 of the CPU 104 assigned to each VM 12.

The memory information conversion unit 113 refers to the memory mounting information and the RA/PA conversion table 142, and performs the conversion in both directions, between the RA and the DIMM number/DIMM address.

The VM activation control unit 114 performs activation control of the VM 12. When a memory error is reported from the error report unit 143, the VM activation control unit 114 instructs the memory map control unit 112 to change the RA/PA conversion table 142, before activating the VM 12. Changing the RA/PA conversion table 142 means to change the association relationship between RA and PA.

Figure 7:
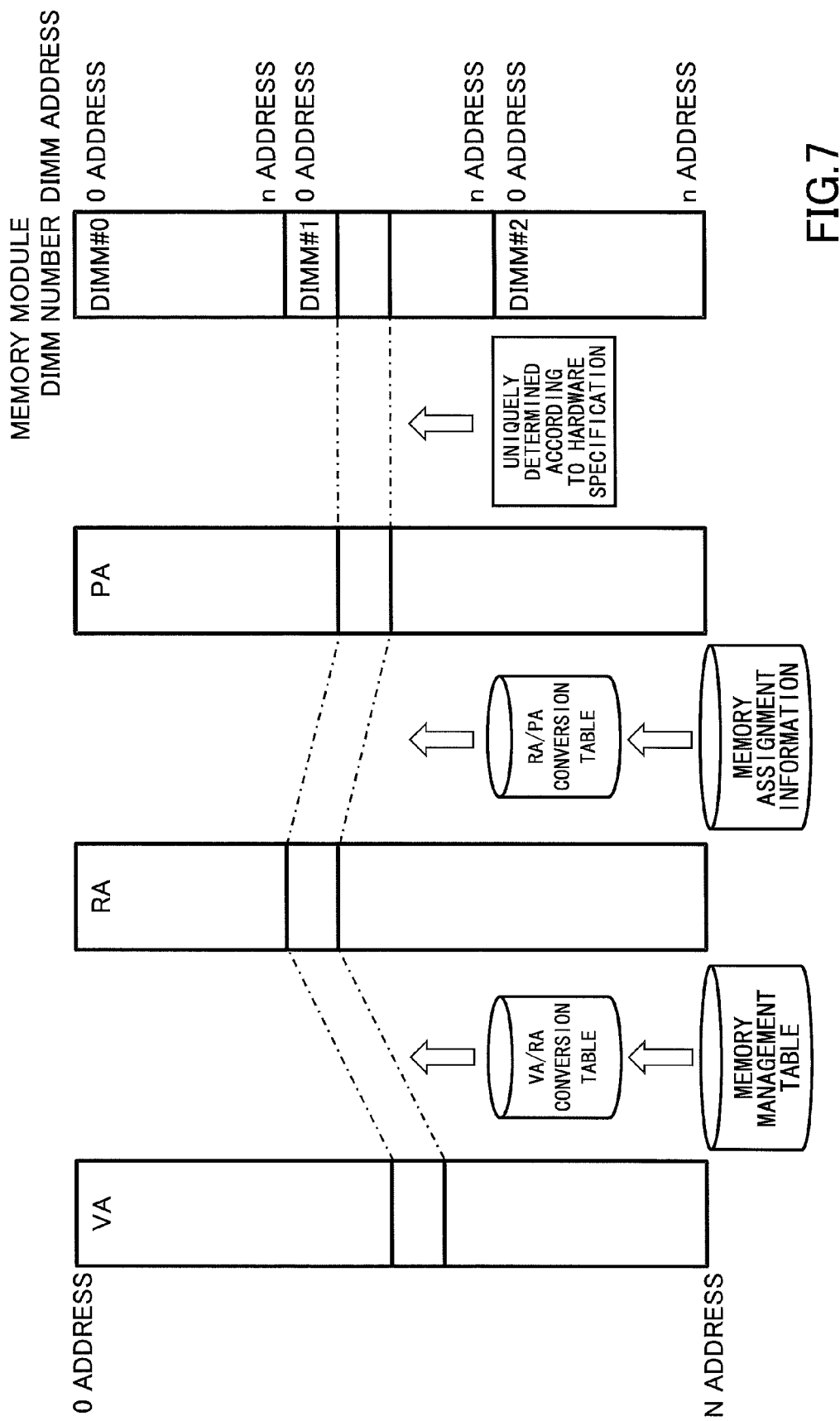
FIG. 7 is for describing an example of memory mapping of a virtualization environment according to the present embodiment.

Next, a description is given of memory mapping of the virtualization environment in the information processing device 10 according to the present embodiment. That is to say, a description is given of the relationship between VA, RA, PA, and the DIMM number/DIMM address. FIG. 7 is for describing an example of memory mapping of a virtualization environment according to the present embodiment.

The mapping (association) of VA and RA is managed by the VA/RA conversion table 141 of each VM 12. The OS 13 on each VM 12 generates conversion information for converting VA to RA based on the memory management table 131, and records the conversion information in the VA/RA conversion table 141. When the conversion information for converting VA to RA is recorded in the VA/RA conversion table 141, the CPU 104 may obtain RA from the given VA.

The mapping of RA and PA is managed by the RA/PA conversion table 142 for each VM 12. The memory map control unit 112 of the hypervisor 11 generates the conversion information for converting RA to PA based on the memory assignment information, and records the conversion information in the RA/PA conversion table 142 of the CPU 104. When the conversion information for converting RA to PA is recorded in the RA/PA conversion table 142, the CPU 104 may obtain the PA relevant to the RA obtained based on the VA/RA conversion table 141. The CPU 104 uses the obtained PA to access the memory. Note that the hypervisor 11 may also use the PA to access the memory. In the case of the hypervisor 11, there is no restriction according to each conversion table in the CPU 104, so the hypervisor 11 may access all addresses (PA). That is to say, the hypervisor 11 may access the address assigned to any of the VMs 12.

The mapping of PA and the DIMM number/DIMM address usually corresponds to a unique relationship determined by the hardware specification. For example, in a memory controller (not illustrated) the mapping is incorporated as logic. The logic is also stored in the configuration information storage unit 111 as memory mounting information. Note that in the present embodiment, consideration is made for cases where the association between the PA and the DIMM number/DIMM address is variable. Therefore, the mapping of PA and the DIMM number/DIMM address is mentioned.

According to the three cases of mapping described above, the CPU 104 may access the PA from the assigned VA. The access to a memory module corresponding to the PA is performed by a memory controller (not illustrated).

Figure 8:
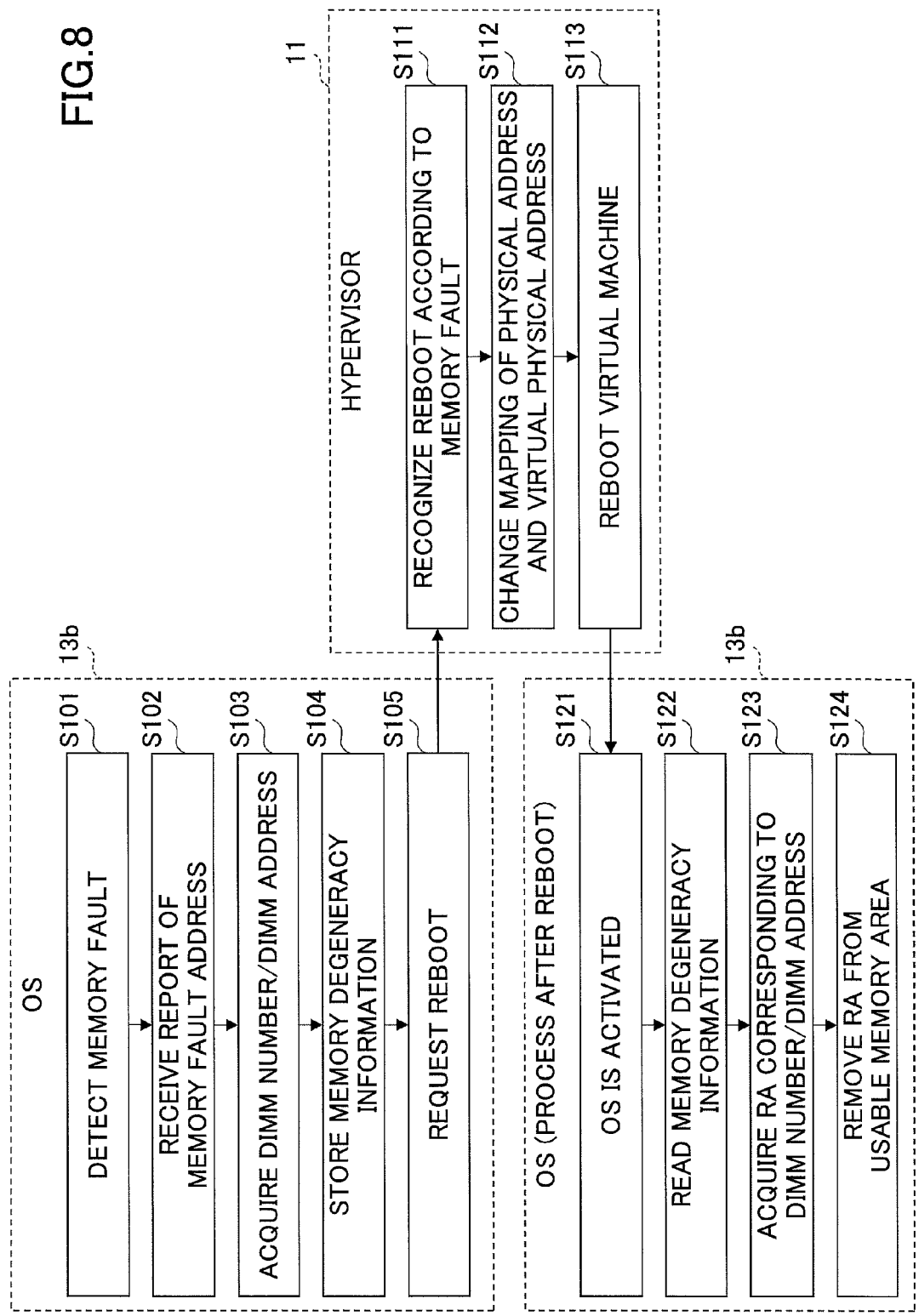
FIG. 8 illustrates an example of the overview of a process executed by the information processing device.

In the following, a description is given of processing procedures executed by the information processing device 10. FIG. 8 illustrates an example of the overview of a process executed by the information processing device 10.

For example, when a fault of a memory is detected in the VM 12b (step S101) the OS 13b operating on the VM 12b receives, from the CPU 104, a report of the memory address (RA) at which the fault has occurred (step S102). Next, the OS 13b acquires the DIMM number/DIMM address corresponding to the reported RA (step S103).

Next, the OS 13b stores the DIMM number/DIMM address as memory degeneracy information in the OS disk 120b (step S104). Next, as the OS 13b panics, it requests the hypervisor 11 to reboot the VM 12b (step S105).

In response to the reboot request, the hypervisor 11 recognizes that the OS 13b has panicked due to a fault of the memory (step S111). Next, the hypervisor 11 changes the assignment (mapping of PA and RA) of the memory relevant to the VM 12b that is the reboot target (step S112). That is to say, with respect to the VM 12b, the memory assignment information and the RA/PA conversion table 142b are changed. At this time, the memory assignment information and the RA/PA conversion table 142b are changed such that the PA relevant to fault position of the memory is not associated with the RA to which the kernel space of the OS 13b is to be assigned. Next, the hypervisor 11 reboots the VM 12b (step S113).

Next, as the VM 12b is rebooted, the OS 13b is rebooted (step S121). At this time, the PA assigned to the kernel space of the OS 13b is highly likely to not include the fault position, and therefore the OS 13b is highly likely to be normally rebooted.

Next, the rebooted OS 13b reads the memory degeneracy information from the OS disk 120b (step S122). Next, the OS 13b acquires the RA corresponding to the DIMM number/DIMM address indicated by the memory degeneracy information (step S123). Next, the OS 13b removes the RA from the usable memory area (step S124). As a result, in the subsequent processes, a memory error based on the same fault position is suppressed from occurring.

Figure 9:
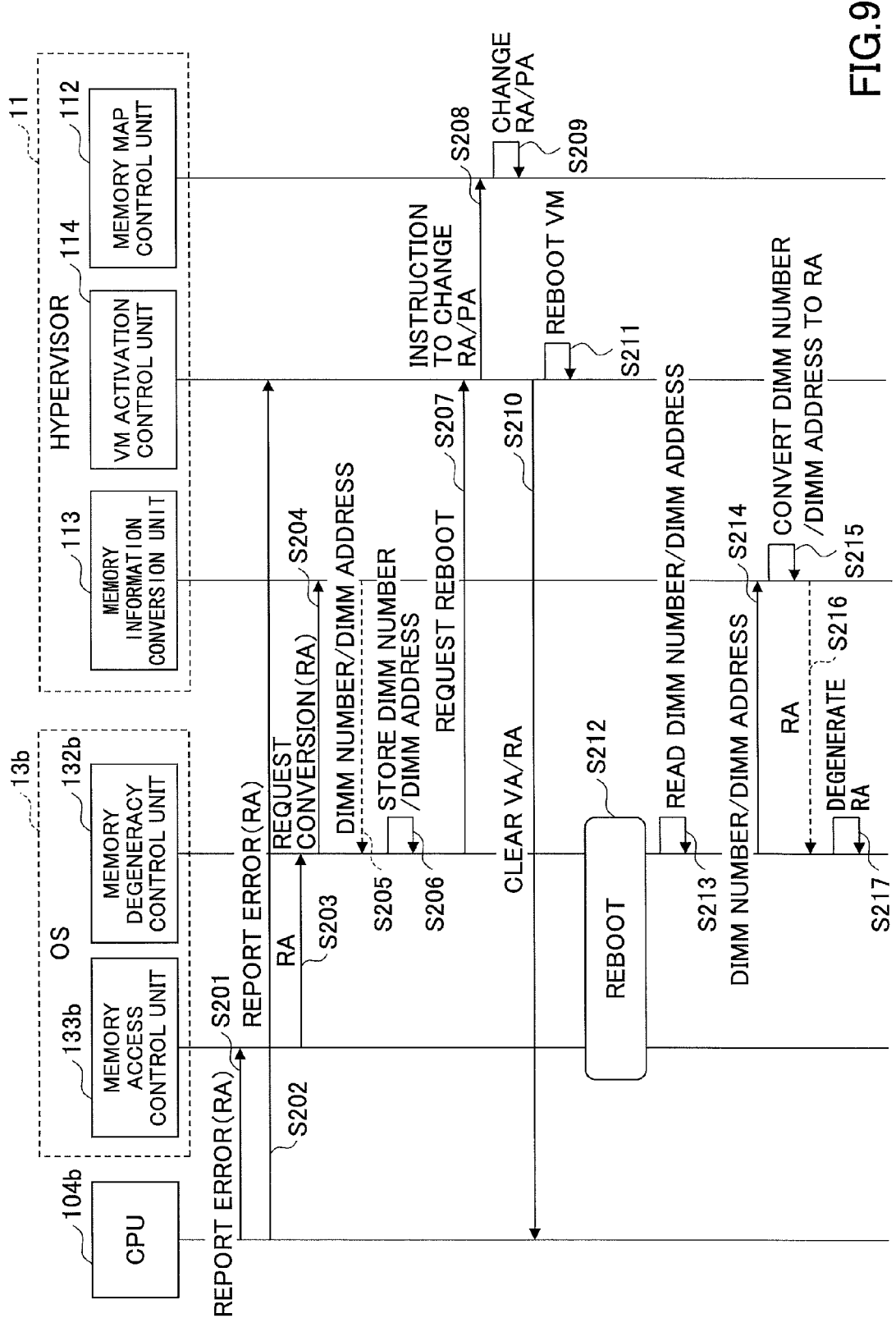
FIG. 9 is a sequence diagram for describing an example of processing procedures executed by the information processing device.
Figure 10:
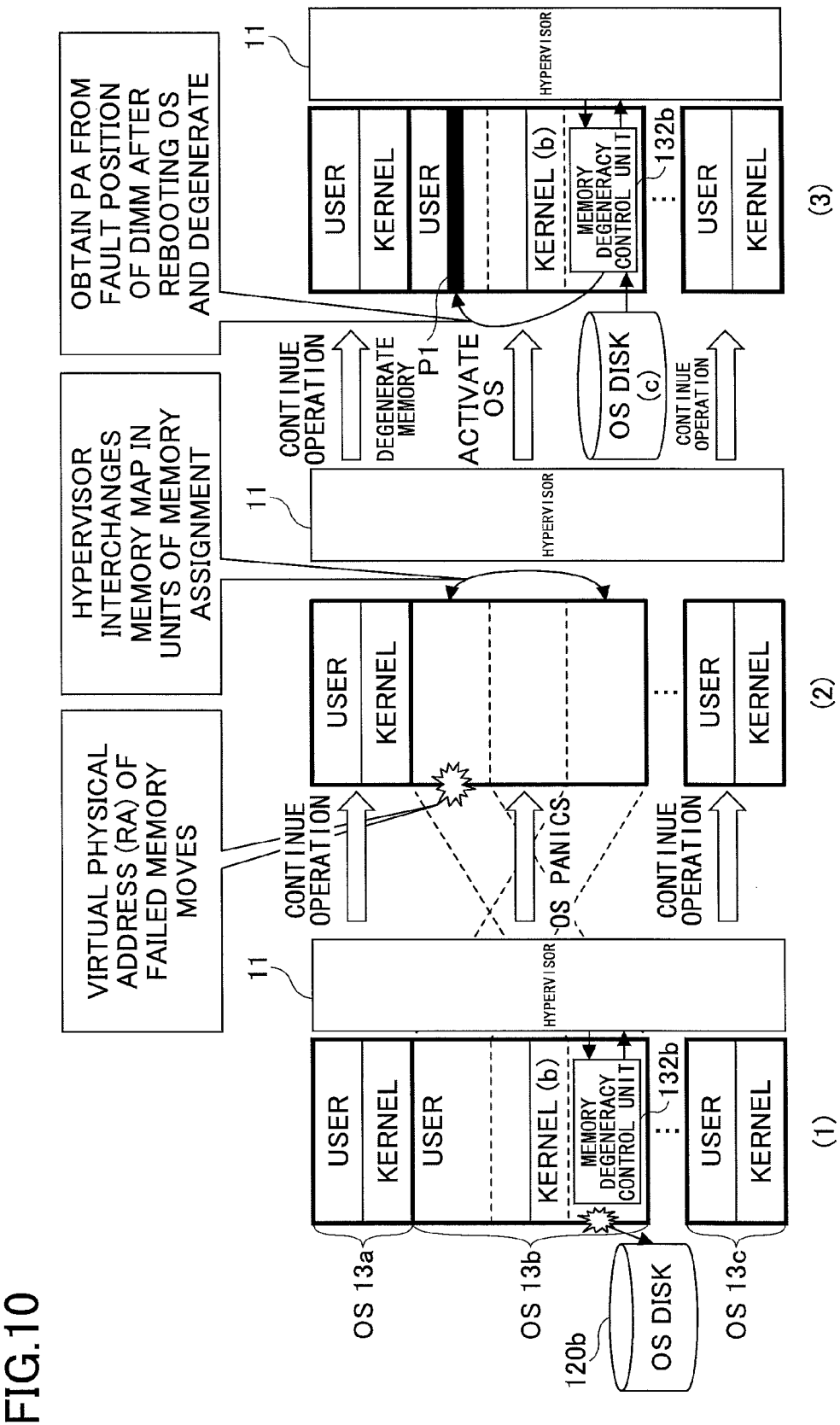
FIG. 10 is for supplementing the description of processing procedures executed by the information processing device.

Next, a more detailed description is given of the processing procedures executed by the information processing device 10. FIG. 9 is a sequence diagram for describing an example of processing procedures executed by the information processing device 10. Furthermore, FIG. 10 is for supplementing the description of processing procedures executed by the information processing device 10.

For example, when the CPU 104b detects a memory fault as a result of accessing the PA corresponding to the VA specified in an instruction code of the OS 13b, the error report unit 143b reports the occurrence of the memory error to the memory access control unit 133b of the OS 13b and the VM activation control unit 114 of the hypervisor 11 (steps S201, S202). In the report, the RA corresponding to the VA that is the access target is specified. The RA is obtained based on the VA/RA conversion table 141.

Next, the memory access control unit 133b reports the reported RA to the memory degeneracy control unit 132b (step S203). The memory degeneracy control unit 132b requests the memory information conversion unit 113 of the hypervisor 11 to convert the reported RA to the DIMM number/DIMM address (step S204). The memory information conversion unit 113 converts the RA to the DIMM number/DIMM address, and sends the conversion result as a response to the memory degeneracy control unit 132b (step S205). Note that the conversion of the RA to the DIMM number/DIMM address is performed with the use of the memory assignment information and the memory mounting information stored in the configuration information storage unit 111. That is to say, the conversion from RA to PA is performed with the use of the memory mounting information that is the association information of RA and PA. Next, with the use of the memory mounting information, which is the association information of PA and the DIMM number/DIMM address, PA is converted into the DIMM number/DIMM address.

Next, the memory degeneracy control unit 132b stores the DIMM number/DIMM address as memory degeneracy information in the OS disk 120b (step S206).

The state up to the above is illustrated in (1) of FIG. 10. FIG. 10 (1) illustrates that a memory fault is detected in the kernel space of the OS 13b operating on the VM 12b, and the DIMM number/DIMM address corresponding to the fault position is stored in the OS disk 120b.

Next, the OS 13b panics. In a panic process, the memory degeneracy control unit 132b of the OS 13b requests the VM activation control unit 114 of the hypervisor 11 to reboot the VM 12b (step S207). The VM activation control unit 114 recognizes that the OS 13b has panicked due to a memory fault, based on the fact that the reboot request is given after the report that a memory error has occurred from the error report unit 143b in step S204. Thus, the VM activation control unit 114 requests the memory map control unit 112 to change the RA/PA conversion table 142b (step S208).

In response to the request, the memory map control unit 112 executes the process of changing the association relationship (memory mapping) of RA and PA, with respect to the VM 12*b* (step S209). As a result, the contents of the memory assignment information and the RA/PA conversion table 142*b* are rewritten, and the memory assignment information and the RA/PA conversion table 142*b* are changed such that the PA relevant to the fault position of the memory is not associated with the RA to be assigned to the kernel space of the OS 13*b*.

The state of step S209 is illustrated in (2) of FIG. 10. FIG. 10 (2) illustrates that the physical memory area assigned to the kernel space of the OS 13*b*, and the physical memory area assigned to the user space, are interchanged. As a result, the RA corresponding to the fault position is moved.

Note that other than the VM 12*b*, the VM 12*a* and the VM 12*c* are continuing to normally operate. Next, as the VM 12*b* is rebooted, the VM activation control unit 114 clears the VA/RA conversion table 141*b* of the CPU 104*b* (step S210). Next, the VM activation control unit 114 reboots the VM 12*b* (step S211). As the VM 12*b* is rebooted, the OS 13*b* is also rebooted (step S212). At this time, the PA corresponding to the RA assigned to the kernel space of the OS 13*b* does not include the fault position, and therefore the OS 13*b* is normally rebooted.

When the OS 13*b* is rebooted, the memory degeneracy control unit 132*b* reads the DIMM number/DIMM address stored as memory degeneracy information in the OS disk 120*b* (step S213). Next, the memory degeneracy control unit 132*b* requests the memory information conversion unit 113 to convert the DIMM number/DIMM address into RA (step S214). The memory information conversion unit 113 converts the DIMM number/DIMM address into RA, based on the memory mounting information and the memory assignment information (step S215). Specifically, the DIMM number/DIMM address are converted into PA, based on the memory mounting information. Then, the PA is converted into RA based on the memory assignment information.

Next, the memory information conversion unit 113 sends the RA that is the conversion result to the memory degeneracy control unit 132*b* as a response (step S216). Next, the memory degeneracy control unit 132 updates the memory management table 131*b*, and removes the memory area including the RA from the usage target (step S217).

FIG. 11 illustrates a configuration example of the memory management table 131*b*. As illustrated in FIG. 11, the memory management table 131*b* stores a value indicating the usage state for each page number.

The relationship between a page number a RA is unique. For example, in a case where the minimum memory size that is possible to be subjected to degeneracy control in the OS 13*b* is 8 K bytes, a value obtained by right shifting the RA by 13 bits becomes the page number. A value obtained by right shifting the RA by 13 bits is a value obtained by rounding off the RA in units of 8 K bytes. Therefore, the page number indicates an area of the RA in units of 8 K bytes.

As the usage state, 0, 1, or 2 is recorded. 0 indicates "not in use". 1 indicates "in use". 2 indicates "non-usable".

Therefore, in step S217, the memory degeneracy control unit 132 records "2" for the page number matching a value obtained by right shifting 13 bits of the RA, which is to be removed from the usage target.

For example, in FIG. 11, "2" is recorded for page number 1000. Therefore, FIG. 11 indicates a state where a fault has occurred in the memory in part of or the entire range of RA=8192000 bytes through 8200191 bytes.

As described above, when degeneracy is performed by the OS 13, it is possible to limit the degeneracy unit to units of pages, for example. In the example of FIG. 11, the degeneracy unit may be set as 8 K bytes. As a result, it is possible reduce memory areas that do not become a usage target even though the memory areas are normal.

Note that FIG. 10 (3) corresponds to steps S213 through S217. In FIG. 10 (3), the DIMM number/DIMM address are read also as memory degeneracy information, and the DIMM number/DIMM address are converted into RA by the hypervisor 11. Furthermore, FIG. 10 (3) indicates that the page P1 including the RA is being degenerated.

Next, a description is given of a process executed by the information processing device 10 when a request to acquire a memory area is generated. A request to acquire a memory area may be generated in the OS 13*b*, or may be generated in a program (for example, an operation program) operating on the OS 13*b*.

Figure 12:
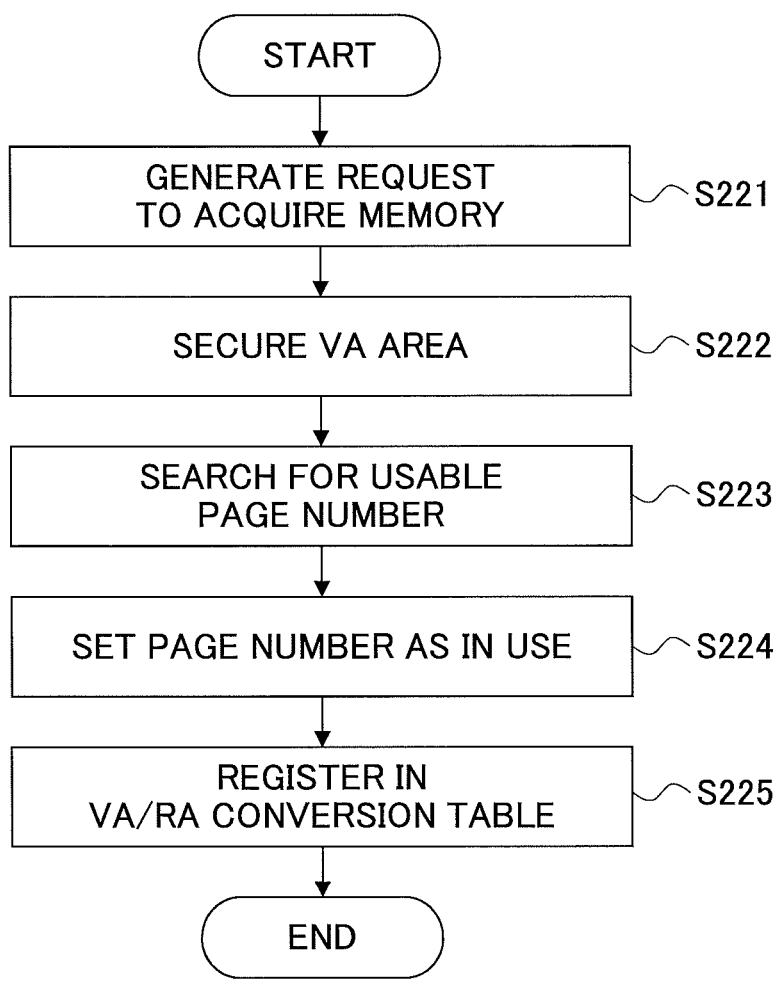
FIG. 12 is a flowchart for describing an example of processing procedures executed in response to a request to acquire a memory area.

FIG. 12 is a flowchart for describing an example of processing procedures executed in response to a request to acquire a memory area.

When a request to acquire a memory area is generated (step S221), the memory access control unit 133*b* secures a virtual memory area corresponding to the size specified in the acquisition request (step S222). Next, the memory access control unit 133*b* refers to the memory management table 131*b*, and searches for a page number that is possible to use (step S223). That is to say, in the memory management table 131*b*, a page number whose usage state value is "0" is being searched.

Next, the memory access control unit 133*b* records "1" as the usage state of the page number of a page having a size corresponding to the acquisition request, among the search-located page numbers (step S224). Next, the memory access control unit 133*b* registers, in the VA/RA conversion table 141*b* of the CPU 104*b*, the association information indicating the association between the VA of the virtual memory area secured in step S222 and the RA relevant to the page number set to be "in use" in step S224 (step S225).

As described above, the RA whose usage state is "2" is not registered in the VA/RA conversion table 141*b*. Furthermore, the OS 13*b* does not access the memory by using addresses other than VA. That is to say, the OS 13*b* does not access the memory by using RA. As a result, a memory area whose usage state value is set as "2", i.e., a memory area including a fault position, is degenerated.

Figure 13:
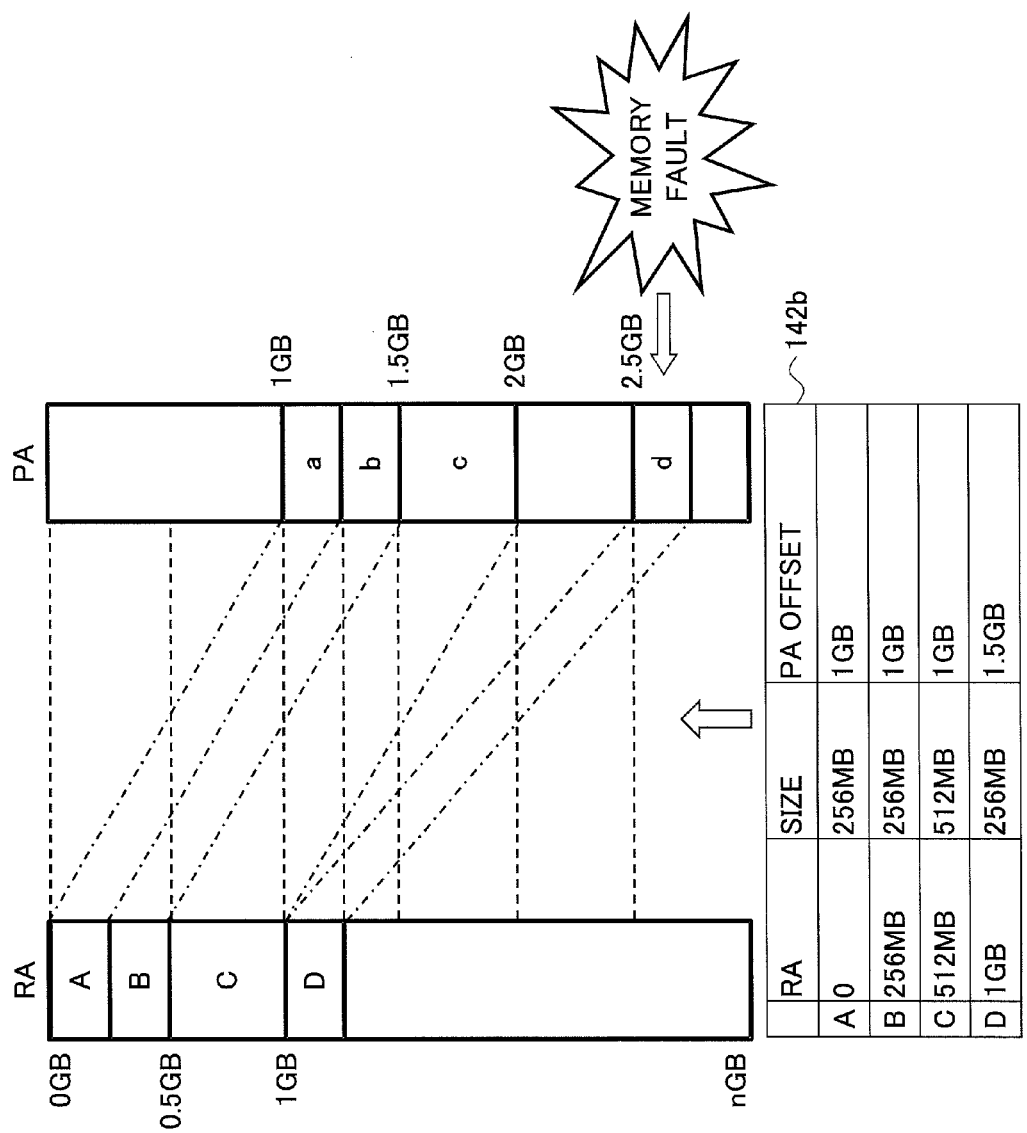
FIG. 13 is for describing a first example of a process of changing memory mapping.
Figure 14:
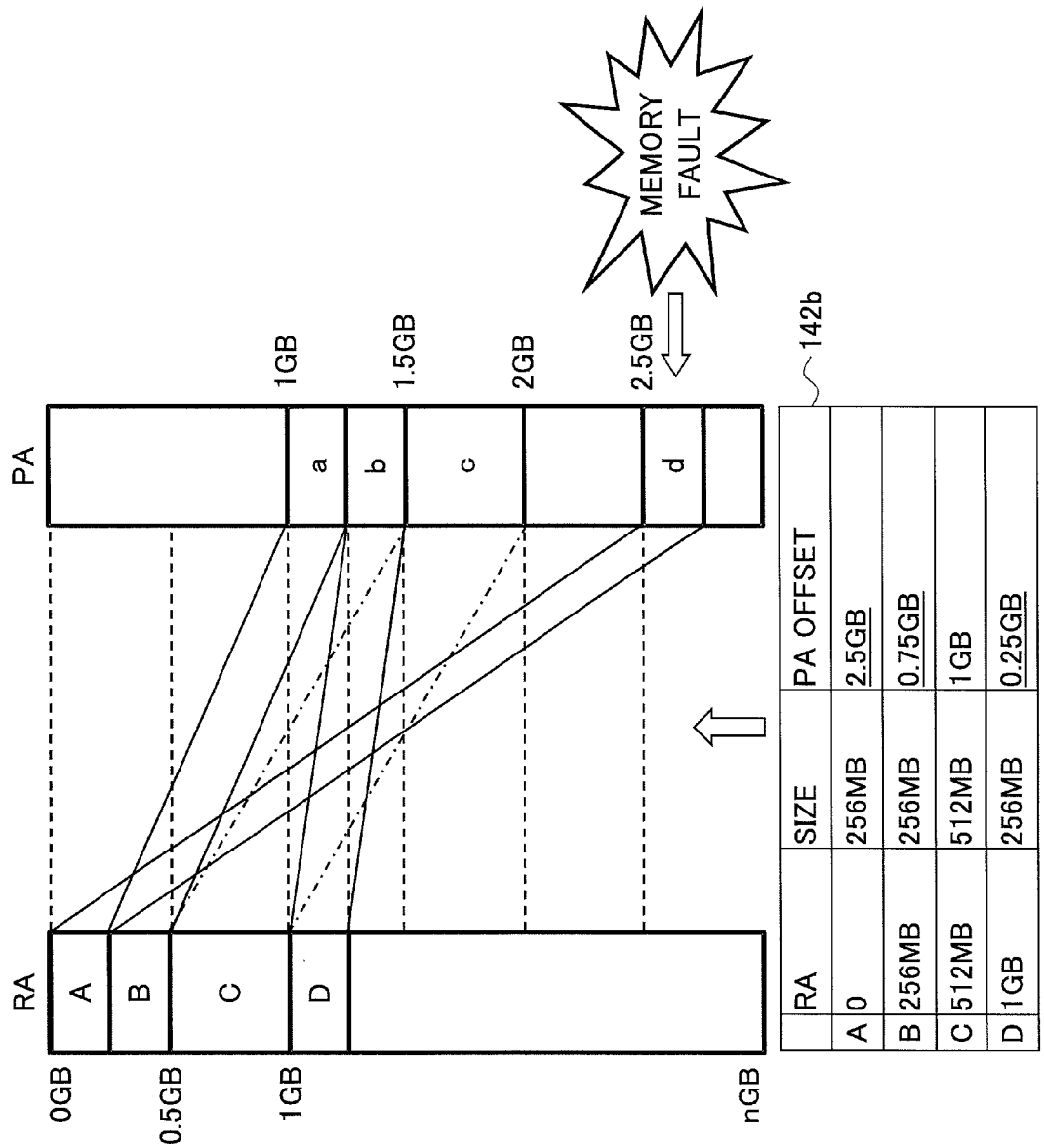
FIG. 14 is for describing the first example of a process of changing memory mapping.
Figure 15:
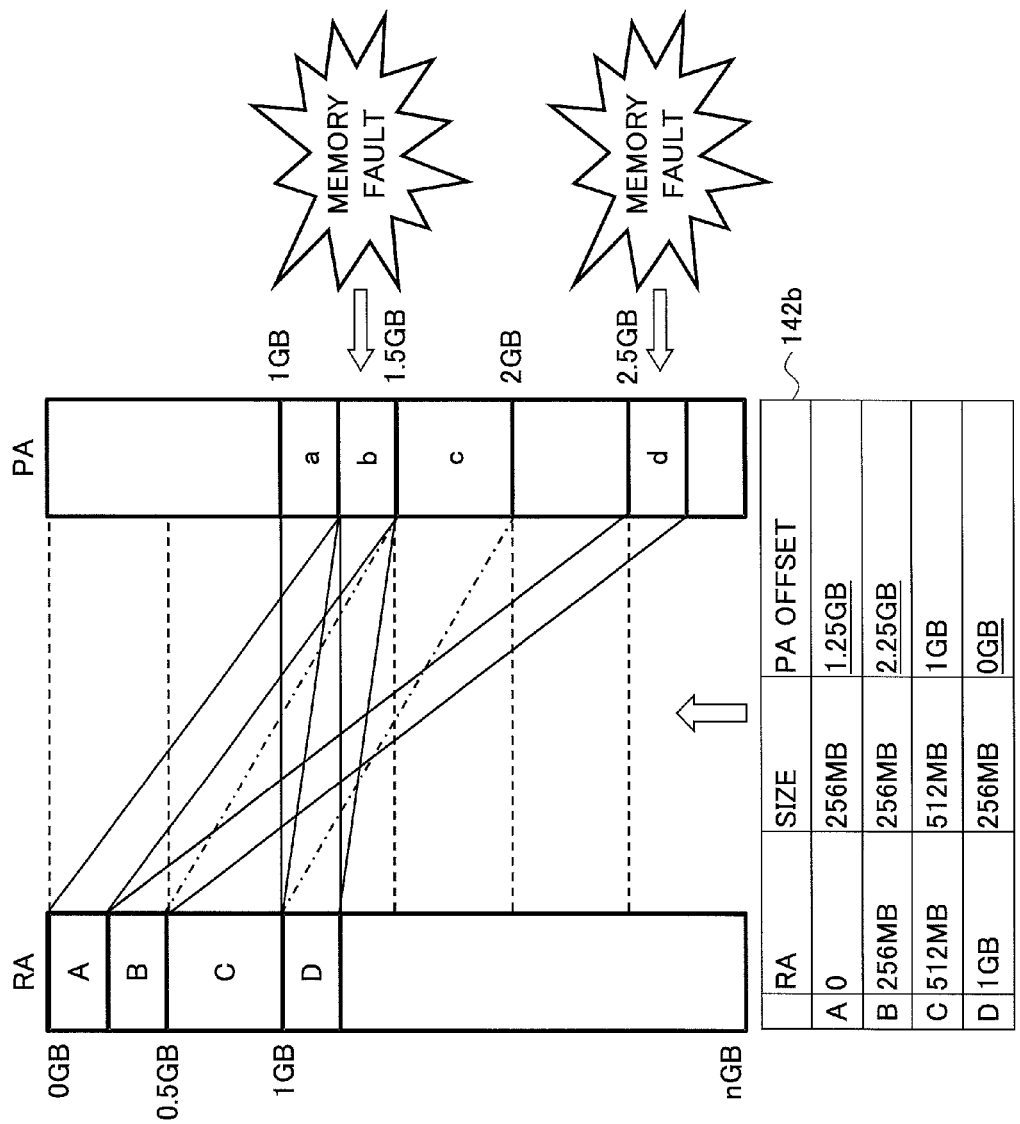
FIG. 15 is for describing the first example of a process of changing memory mapping.

Next, a description is given of details of step S209 of FIG. 9. FIGS. 13, 14, and 15 are for describing a first example of a process of changing memory mapping. Note that in this example, it is assumed that the kernel space has an architecture in which the addresses are arranged in a descending order starting with the highest address. In a case where the kernel space has an architecture in which the addresses are arranged in an ascending order starting with the lowest address, the highness/lowness of addresses is to be reversed in the mapping changing process described below.

As illustrated in FIG. 13, the entries in the RA/PA conversion table 142*b* according to the first example include items such as RA, size, and PA offset. The PA corresponding to the RA of each entry is obtained by "RA+PA offset". That is to say, this indicates that the virtual physical memory area corresponding to the "size" starting from RA is mapped in the physical memory area corresponding to the "size" starting from RA+PA offset. In the following, the virtual physical memory area is referred to the "RA area" and the physical memory area is referred to the "PA area".

In the state of FIG. 13, the mapping of RA=PA is A(0~256 M bytes)=a(1~1.25 G bytes), B(256~512 M bytes)=b (1.25~1.5 G bytes), C(512~1024 M bytes)=c(1.5~2 G bytes), and D(1024~1280 M bytes)=d(2.5~2.75 G bytes). Furthermore, in the order of A, B, C, and D, the RA are arranged from the lowest RA to the highest RA. In this state, it is assumed that a memory fault is detected in the PA area d, and activation of the OS 13b has failed. Note that it is assumed that the RA area D is the RA area that is assigned to the kernel space.

(1) First, the memory map control unit 112 searches for the entry whose RA is the highest address in the RA/PA conversion table 142b. In this example, the entry D is found.

(2) Next, the memory map control unit 112 extracts an entry having the same size value as that of the entry D, from the RA/PA conversion table 142b. That is to say, the entry having a size value of 256 M bytes is extracted. Here, the entry A and the entry B are extracted.

(3) Next, the memory map control unit 112 sequentially changes the PA offset of the entries A, B, and D, such that the PA of the entry D found in (1) is mapped at the lowest RA, among the entries extracted in (2). Among the entries A and B, the entry A has the lower RA value. Thus, the mapping of A=a, B=b, D=d is changed to A=d, B=a, D=b. That is to say, the mapping is rotated. Note that the entry C has a different size from the entry D, and is thus not a target of changing mapping.

FIG. 14 illustrates a state after such a rotation of mapping has been performed. In FIG. 14, the PA area b corresponding to the RA area D assigned to the kernel space is not the location where a memory fault has occurred. Therefore the OS 13b is highly likely to be normally activated.

Assuming that a fault is detected in the PA area b while the OS 13b is activated, the OS 13b panics again, and is rebooted again. In this case, the processes of (1), (2), and (3) described above are repeated. Specifically, the mapping of A=d, B=a, D=b is rotated to A=b, B=d, D=a.

FIG. 15 illustrates a state after such a rotation of mapping has been performed. In FIG. 15, the PA area a corresponding to the RA area D assigned to the kernel space is not the location where a memory fault has occurred. Therefore, the OS 13b is highly likely to be normally activated. When the activation of the OS 13b is successful, the memory degeneracy control unit 132b degenerates the fault part of the memory. At this time, the degeneracy is not performed in units of entries of the RA/PA conversion table 142; the area that is the minimum unit of the memory that is possible to be subjected to degeneracy control in the OS 13b is degenerated.

Assuming that a memory fault is detected in the PA area a in the state of FIG. 15, the same process is further repeated. In FIGS. 13 through 15, the RA areas having the same size are only the three areas A, B, and D, and therefore there is a possibility that an endless loop may occur. However, actually, a sufficiently large number of entries are included in the RA/PA conversion table 142b, and the memory area of the kernel space needed for activating the OS 13b is sufficiently small, and therefore the possibility of an endless loop is low. However, in a case where the maximum number of continuous faults in rebooting is defined in order to suppress an endless loop, and the maximum value is reached, the activation of the VM 12b may be suppressed.

Note that as it is clearly seen in FIGS. 13 through 15, the memory map control unit 112b interchanges the mapping with RA, with respect to the PA area which has already been assigned to the VM 12b (before detecting a memory fault). That is to say, instead of newly assigning, to the VM 12b, a PA area that is not assigned to any VM 12, a change is made to the existing mapping. By doing so, it is possible to avoid a circumstance where the unit of degeneracy is dependent on the unit of entries (256 M bytes in the case of the PA area d) of the RA/PA conversion table 142. That is to say, for example, in the state of FIG. 13, assuming that the RA area D is mapped to a new PA area, the PA area d corresponding to 256 M bytes becomes a memory area that is not used. Meanwhile, when a change is made with respect to the existing mapping as in the present embodiment, the usage of the PA area d is continued. As a result, the range to be degenerated is limited to the area of the minimum unit (for example, 8 K bytes) of the memory which may be subjected to degeneracy control in the OS 13b, in the PA area d.

Figure 16:
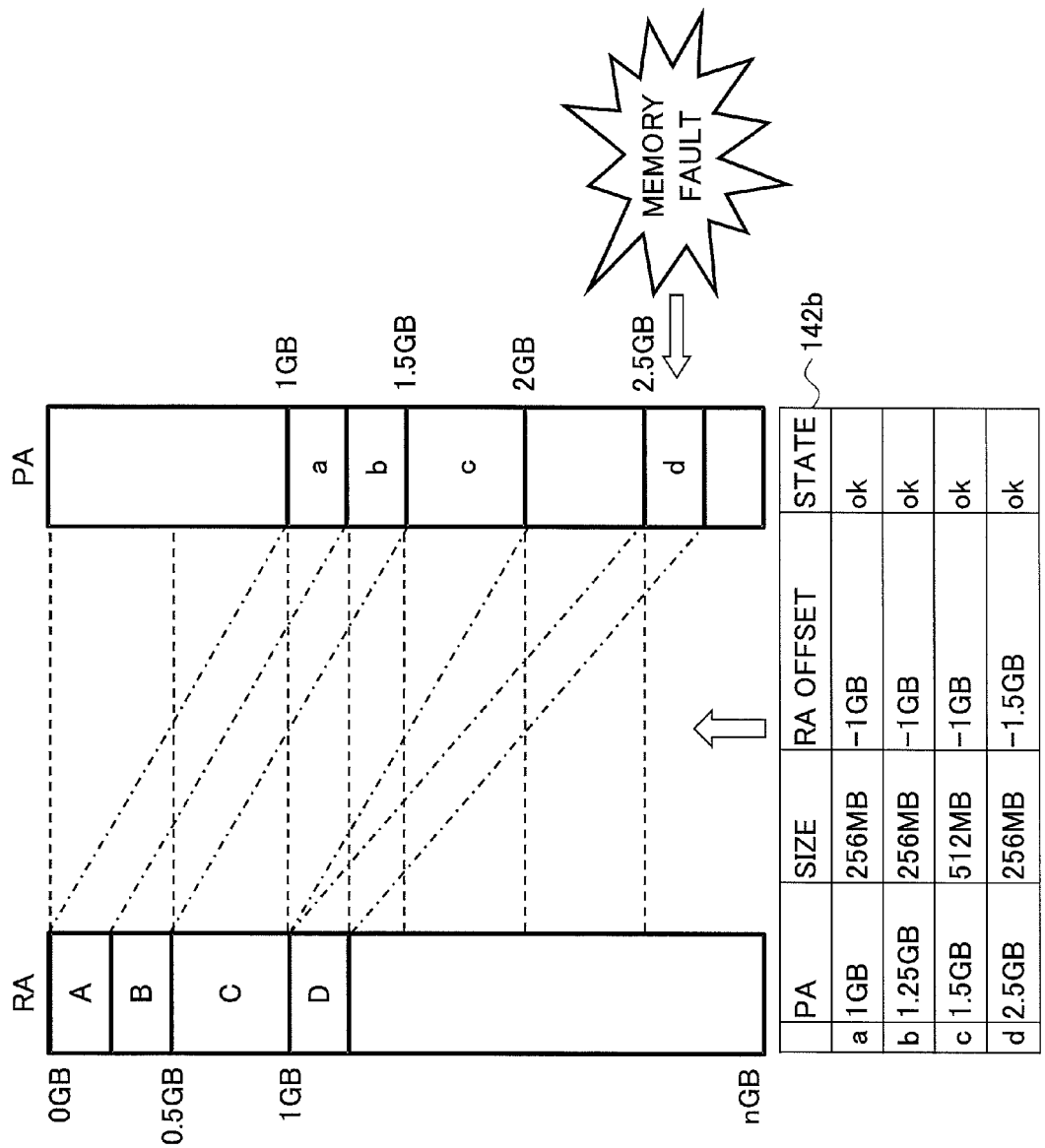
FIG. 16 is for describing a second example of a process of changing memory mapping.
Figure 17:
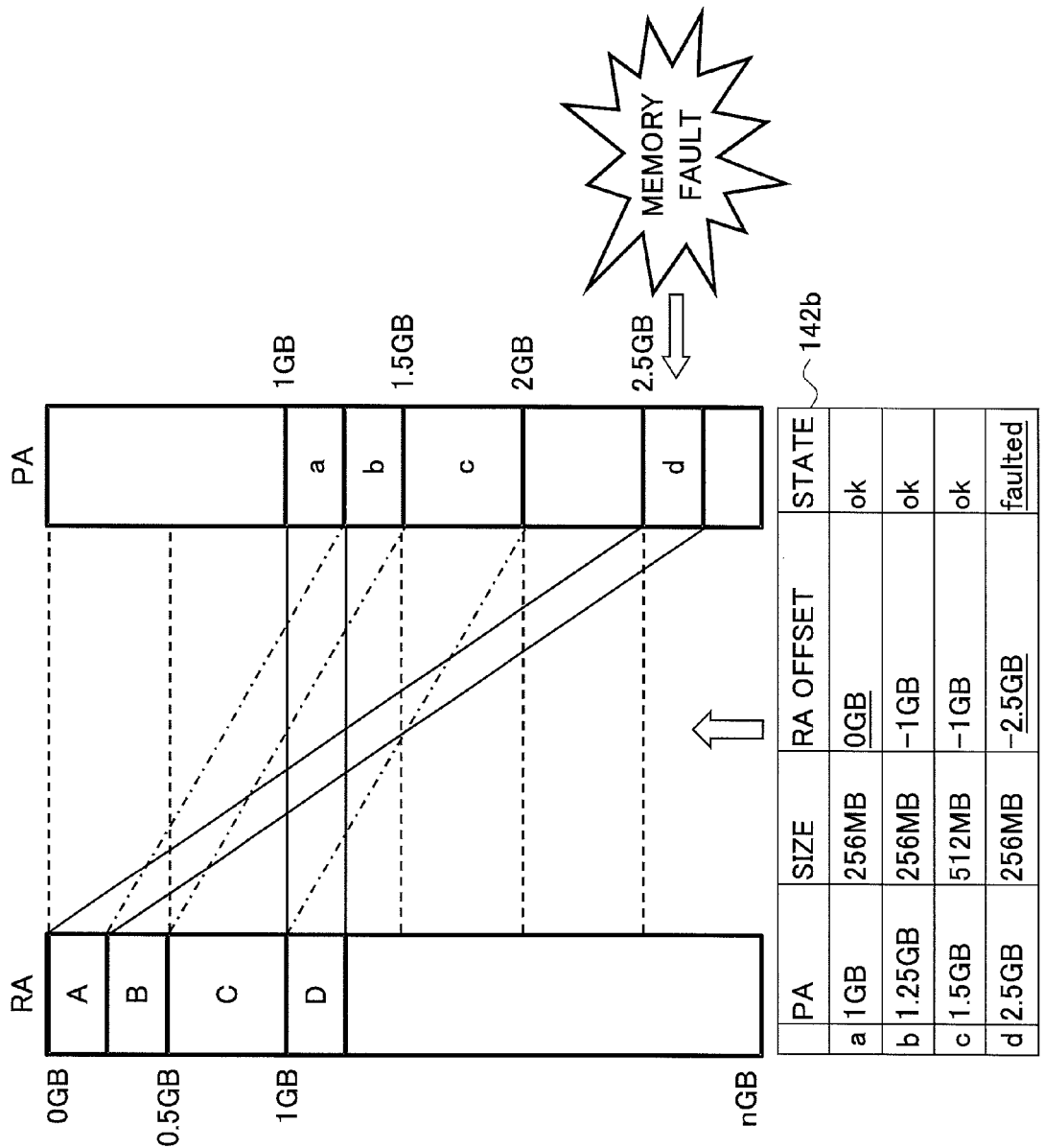
FIG. 17 is for describing the second example of a process of changing memory mapping.
Figure 18:
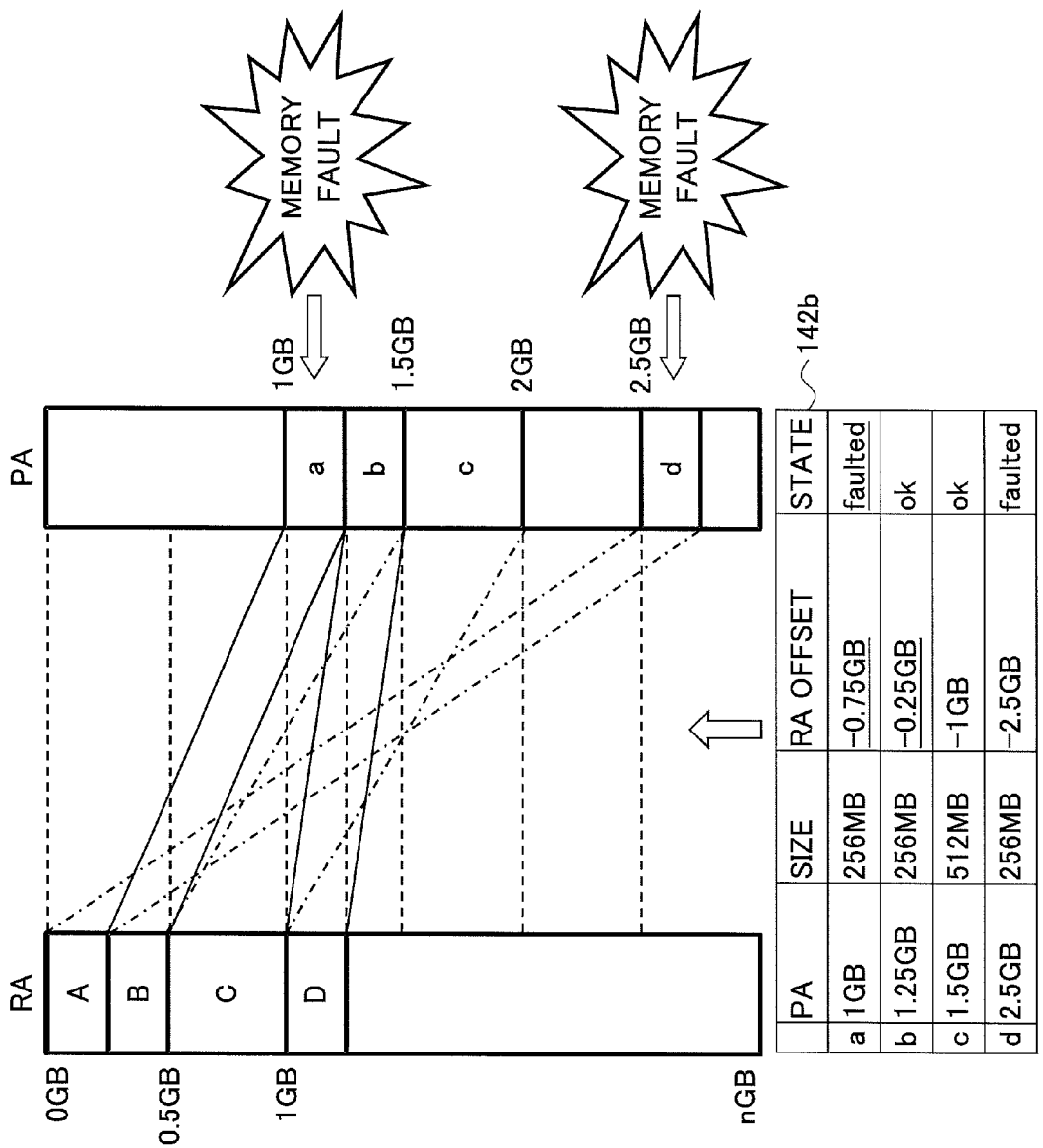
FIG. 18 is for describing the second example of a process of changing memory mapping.

The process of changing memory mapping may be executed as described below. FIGS. 16, 17, and 18 are for describing a second example of a process of changing memory mapping. Note that also in this example, it is assumed that the kernel space has an architecture in which the addresses are arranged in a descending order starting with the highest address. In a case where the kernel space has an architecture in which the addresses are arranged in an ascending order starting with the lowest address, the highness/lowness of addresses is to be reversed in the mapping changing process described below.

As illustrated in FIG. 16, the entries in the RA/PA conversion table 142b according to the second example include items such as PA, size, RA offset, and the state. The RA of each entry is obtained by "PA+RA offset". That is to say, this indicates that the RA area corresponding to the "size" starting from PA+RA offset is mapped in the PA area corresponding to the "size" starting from PA. Furthermore, as the state, either ok or failed is recorded. An ok indicates a normal state. A failed indicates that a position that has failed in the past is included.

In the state of FIG. 16, the mapping of RA=PA is A(0~256 M bytes)=a(1~1.25 G bytes), B(256~512 M bytes)=b (1.25~1.5 G bytes), C(512~1024 M bytes)=c(1.5~2 G bytes), D(1024~1280 M bytes)=d(2.5~2.75 G bytes). In this state, it is assumed that a memory fault is detected in the PA area d, and activation of the OS 13b has failed. Note that the RA area D is the RA area that is assigned to the kernel space.

(1) First, the memory map control unit 112 searches for the entry including the RA that has been reported from the error report unit 143b, in the RA/PA conversion table 142b. In this example, the entry d is found, and therefore the memory map control unit 112 changes the state of the entry d to failed.

(2) Next, the memory map control unit 112 extracts an entry having the same size value as that of the entry d, and whose state value is ok, from the RA/PA conversion table 142. Here, the entry a and the entry b are extracted.

(3) Next, the memory map control unit 112 extracts the entry having the lowest RA among the entries extracted in (2). Here, the entry a is extracted.

(4) Next, the memory map control unit 112 changes the RA offset of the entries a and d, such that the RA area D corresponding to the PA area d and the RA area A corresponding to the PA area a are interchanged. Here, A=a, D=d are changed to A=d, D=a. FIG. 17 illustrates a state where the mapping is changed as described above. In FIG. 17, the PA area a corresponding to the RA area D assigned to the kernel space is not the location where a memory fault has occurred. Therefore, the OS 13b is highly likely to be normally activated.

Assuming that a fault is detected in the PA area a while the OS 13b is rebooted, the OS 13b panics again, and is rebooted again. In this case, the processes of (1), (2), (3), and (4) described above are repeated. This time, in (2), as the states of the entries a and d are failed, only the entry b is extracted. In (4), the RA corresponding to d and the RA corresponding to b are interchanged. That is to say, the mapping of B=b, D=a is changed to B=a, D=b.

FIG. 18 illustrates a state after such a change in mapping has been performed. In FIG. 18, the PA area b corresponding to the RA area D assigned to the kernel space is not the location where a memory fault has occurred. Therefore, the OS 13*b* is highly likely to be normally activated. When the activation of the OS 13*b* is successful, the memory degeneracy control unit 132*b* degenerates the fault part of the memory. At this time, the degeneracy is not performed in units of entries of the RA/PA conversion table 142; the area that is the minimum unit of the memory that is possible to be subjected to degeneracy control in the OS 13*b* is degenerated.

As described above, also in the second example, the memory map control unit 112*b* interchanges the mapping with RA, with respect to the PA area which has already been assigned to the VM 12*b*. Therefore, it is possible to avoid a circumstance where the unit of degeneracy is dependent on the unit of entries (256 M bytes in the case of the PA area d) of the RA/PA conversion table 142.

Note that the OS 13 is involved with VA and RA but is not involved with PA. Therefore, by changing the mapping of RA and PA, there is a low possibility that a problem occurs in the operation of the OS 13.

Note that in the present embodiment, a description is given of an example where a memory fault is detected in the VM 12*b*; however, when a memory fault is detected in another VM 12, the same process is to be executed for the other VM 12.

Furthermore, in the present embodiment, a description is given of storing the DIMM number/DIMM address as an example of memory degeneracy information. However, generally, the relationship between the DIMM number/DIMM address and the PA, is often fixed. Furthermore, even if this relationship is variable, the relationship is often substantially fixed at the time of operations. Therefore, PA may be stored instead of the DIMM number/DIMM address. In essence, the address information that does not affect the changing of the mapping of RA and PA, is to be stored as the memory degeneracy information. Furthermore, when a memory module other than DIMM is used, such as SIMM (Single In-line Memory Module), the fault position may be identified by a method adapted to the memory module.

As described above, according to the present embodiment, by a mechanism applicable to a large-scale virtualization environment, it is possible to prevent the OS 13 from repeatedly panicking due to a memory fault.

That is to say, the mapping of RA and PA is changed so that the PA corresponding to the fault position of the memory is not assigned to the kernel space of the OS 13. As a result, it is possible to prevent the OS 13 from repeatedly panicking, which is executed in response to the occurrence of a memory error. In this case, the target of reboot is limited to the VM 12 in which the memory fault is detected. That is to say, the information processing device 10 itself does not need to be rebooted.

Furthermore, the degeneracy of the memory is performed by the OS 13 in the VM 12. Furthermore, the hypervisor 11 is to change the mapping of the RA/PA conversion table 142, and is not directly involved with the degeneracy of the memory. Therefore, there is a low possibility of an increase in the information to be managed by the hypervisor 11 for degenerating the memory, in accordance with the increase of VMs 12. Thus, even in a large-scale virtualization environment, there is a low possibility that the management information of the hypervisor 11 becomes large-scale, or that the control of the hypervisor 11 becomes complex, for the purpose of degenerating the memory.

Furthermore, as the OS 13 degenerates the memory, it is possible to degenerate the memory in minimum units of the memory that is possible to be subjected to degeneracy control in the OS 13. Therefore, normal memory areas may be effectively utilized.

Furthermore, the OS 13 does not store the fault position by RA; the fault position is recorded by the DIMM number/DIMM address which is physical address information. Therefore, even if the hypervisor 11 changes the mapping of RA and PA, the RA to be degenerated may be correctly recognized.

According to an aspect of the embodiments, an OS is prevented from repeatedly panicking due to a memory fault, by a mechanism capable of handling a large-scale virtualization environment.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A memory degeneracy method executed by an information processing device in which a plurality of virtual machines operate, the memory degeneracy method comprising:
storing, in a storage unit, a physical address or address information of a memory module, which corresponds to a virtual physical address relevant to a fault, in response to detecting the fault in a memory area assigned to a first virtual machine;
changing an association relationship between virtual physical addresses and physical addresses relevant to the first virtual machine so as to move the physical address relevant to the fault from a reboot portion of the memory area assigned to the first virtual machine to another portion of the memory area assigned to the first virtual machine, before an operating system operating on the first virtual machine is rebooted by use of the reboot portion of the memory area in response to detecting the fault; and
removing, from a usage target of the operating system, the virtual physical address corresponding to the physical address or the address information of the memory module stored in the storage unit.

2. The memory degeneracy method according to claim 1, comprising:
storing, in the storage unit by the operating system of the first virtual machine, the physical address or the address information of the memory module, which corresponds to the virtual physical address relevant to the fault, in response to detecting the fault in the memory area assigned to the first virtual machine;
changing, by a hypervisor, the association relationship between the virtual physical addresses and the physical addresses relevant to the first virtual machine so as to move the physical address relevant to the fault from the reboot portion of the memory area assigned to the first virtual machine to another portion of the memory area assigned to the first virtual machine, before the operating system operating on the first virtual machine is rebooted by use of the reboot portion of the memory area in response to detecting the fault; and removing, from the usage target by the rebooted operating system, the virtual physical address corresponding to the physical address or the address information of the memory module stored in the storage unit.

3. The memory degeneracy method according to claim 1, wherein the changing of the association relationship includes changing the association relationship with the virtual physical addresses, with respect to the physical addresses assigned to the first virtual machine before detecting the fault, such that the physical address relevant to the fault is not associated with a virtual physical address that is assigned to a kernel space of the operating system.

4. An information processing device in which a plurality of virtual machines operate, the information processing device comprising:

at least one processor; and a storage device configured to store one or more programs, wherein the at least one processor executes the one or more programs to perform:

storing a physical address or address information of a memory module, which corresponds to a virtual physical address relevant to a fault, in response to detecting the fault in a memory area assigned to a first virtual machine;

changing an association relationship between virtual physical addresses and physical addresses relevant to the first virtual machine so as to move the physical address relevant to the fault from a reboot portion of the memory area assigned to the first virtual machine to another portion of the memory area assigned to the first virtual machine, before an operating system operating on the first virtual machine is rebooted by use of the reboot portion of the memory area in response to detecting the fault; and removing, from a usage target of the operating system, the virtual physical address corresponding to the physical address or the address information of the memory module stored in the storage unit.

5. The information processing device according to claim 4, wherein the changing of the association relationship includes changing the association relationship with the virtual physical addresses, with respect to the physical addresses assigned to the first virtual machine before detecting the fault, such that the physical address relevant to the fault is not associated with a virtual physical address that is assigned to a kernel space of the operating system.

* * * * *